United States Patent
Balu et al.

(10) Patent No.: US 9,557,979 B2
(45) Date of Patent: Jan. 31, 2017

(54) AUTONOMIC APPLICATION INSTALLATION

(75) Inventors: Suresh Balu, Chapel Hill, NC (US); Solomon M. Bisker, Cambridge, MA (US); Zahir A. Dossa, Irving, TX (US); Hyduke Noshadi, Northridge, CA (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 11/873,460

(22) Filed: Oct. 17, 2007

(65) Prior Publication Data

US 2009/0106752 A1  Apr. 23, 2009

(51) Int. Cl.
*G06F 9/445* (2006.01)
*G06F 9/44* (2006.01)

(52) U.S. Cl.
CPC ............ *G06F 8/61* (2013.01); *G06F 9/44505* (2013.01)

(58) Field of Classification Search
CPC ............... G06F 8/61; G06F 8/60; G06F 8/20; G06F 9/44505
See application file for complete search history.

(56) References Cited

U.S. PATENT DOCUMENTS

| | | | |
|---|---|---|---|
| 5,367,686 A * | 11/1994 | Fisher et al. | 717/174 |
| 5,668,992 A * | 9/1997 | Hammer et al. | 713/1 |
| 6,301,707 B1 * | 10/2001 | Carroll et al. | 717/177 |
| 6,519,581 B1 * | 2/2003 | Hofmann et al. | 706/47 |
| 6,775,829 B1 * | 8/2004 | Kroening | 717/175 |
| 6,990,660 B2 * | 1/2006 | Moshir et al. | 717/171 |
| 7,448,034 B2 * | 11/2008 | Anderson et al. | 717/176 |
| 7,496,911 B2 * | 2/2009 | Rowley | G06F 8/61 717/174 |
| 7,620,907 B2 * | 11/2009 | Resnick | G06F 8/24 700/96 |
| 7,626,944 B1 * | 12/2009 | Riddle | 370/254 |
| 8,041,863 B2 * | 10/2011 | Kwan | G06F 9/44505 707/783 |
| 8,191,060 B2 * | 5/2012 | Malasky | G06F 8/61 715/763 |
| 8,505,005 B1 * | 8/2013 | Bos | G06F 8/61 717/168 |

(Continued)

OTHER PUBLICATIONS

Heiner et al., Secure software installation in a mobile environment, Jul. 2007, 2 pages.*

(Continued)

*Primary Examiner* — Thuy Dao
(74) *Attorney, Agent, or Firm* — Steven M. Greenberg, Esq.; CRGO Law

(57) ABSTRACT

Embodiments of the present invention address deficiencies of the art in respect to application installation and provide a method, system and computer program product for autonomic application installation. In one embodiment of the invention, an autonomic application installation method can be provided. The method can include initiating an installation of an application onto a target computing system, remotely retrieving a configuration for the target computing system previously established for other computing systems installing the application, applying the remotely retrieved configuration to the target computing system prior to installing the application onto the target computing system, and installing the application onto the target computing system.

18 Claims, 2 Drawing Sheets

(56) References Cited

U.S. PATENT DOCUMENTS

| | | | |
|---|---|---|---|
| 8,589,912 B2* | 11/2013 | Hinton | G06F 8/60 717/174 |
| 2007/0027846 A1* | 2/2007 | Christiance et al. | 707/3 |
| 2007/0088630 A1* | 4/2007 | MacLeod et al. | 705/28 |
| 2010/0058328 A1* | 3/2010 | DeHaan | G06F 8/61 717/176 |

OTHER PUBLICATIONS

Shankaran et al., A framework for (re)deploying components in distributed real-time and embedded systems, Apr. 2006, 2 pages.*

* cited by examiner

AUTONOMIC APPLICATION INSTALLATION

BACKGROUND OF THE INVENTION

Field of the Invention

The present invention relates to the field of application installation and more particularly to application installation and configuration for different computing environments.

Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

Typically, software programs include as a component installer logic having program code enabled to substantially automate the installation process. In addition, computer operating systems occasionally incorporate installer logic for use in installing drivers or other software. Likewise, many commercial software offerings are provided with companion updater logic supporting self-updating operations. Generally, the updater logic can be included as a component of the software program itself, or the updater logic can be provided externally as a third-party tool.

Software programs used to install new software, to install updates to software, and to uninstall (remove) software are referred to herein as "installer applications". The term "installer applications" is intended to encompass both stand-alone software programs that can be used to install a variety of software applications (for example, such as installers that may be provided with an operating system), as well as software programs that are adapted to install only a single software application (and may be integrated with the installation file package for that software application). Installer applications, when run, implement a software installation process.

First time installations of enterprise software often can be complicated by the need to custom-tailor the installation to accommodate the minute details of the end user environment. Known solutions to this problem either rely heavily upon the installing user having technical knowledge of the target environment, or rely heavily upon assumptions based upon what limited environment information can be gleaned from the current system. The high likelihood of human or computer error in both circumstances can lead to incomplete or improper installations.

BRIEF SUMMARY OF THE INVENTION

Embodiments of the present invention address deficiencies of the art in respect to application installation and provide a novel and non-obvious method, system and computer program product for autonomic application installation. In one embodiment of the invention, an autonomic application installation method can be provided. The method can include initiating an installation of an application onto a target computing system, remotely retrieving a configuration for the target computing system previously established for other computing systems installing the application, applying the remotely retrieved configuration to the target computing system prior to installing the application onto the target computing system, and installing the application onto the target computing system.

In one aspect of the embodiment, remotely retrieving a configuration for the target computing system previously established for other computing systems installing the application can include determining a platform profile for the target computing system, comparing the platform profile to other platform profiles for the other computing systems installing the application, matching the platform profile with a profile for a selection of the other computing systems installing the application, and remotely retrieving a corresponding configuration for the selection of the other computing systems installing the application. In another aspect of the embodiment, the method further can include determining whether the installation of the application onto the target computing system has succeeded and uploading a configuration for the installed application in the target computing system to a remote data store of installation configurations for use by other computing systems installing the application.

In another embodiment of the invention, an autonomic application installation data processing system can be provided. The system can include a remote data store of application installations configured for communicative coupling to computing systems over a computer communications network. The system further can include an autonomic installer coupled to each of the computing systems. The autonomic installer can include program code enabled to initiate an installation of an application onto a corresponding one of the computing systems, to retrieve from the remote data store a configuration for the corresponding one of the computing systems previously established for others of the computing systems installing the application, to apply the configuration to the corresponding one of the computing systems prior to installing the application onto the corresponding one of the computing systems, and to install the application onto the corresponding one of the computing systems.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for autonomic application installation. In accordance with an embodiment of the present invention, an installation log for the installation of an application can be maintained for multiple different instances of the installation of the application in different user environments. When installing the application to a new user environment, the new user environment can be compared to the user environments of the installation log. Thereafter, the configuration settings for installing the application associated with a matching user environment can be retrieved and applied in installing the application to the new user environment.

Figure 1:
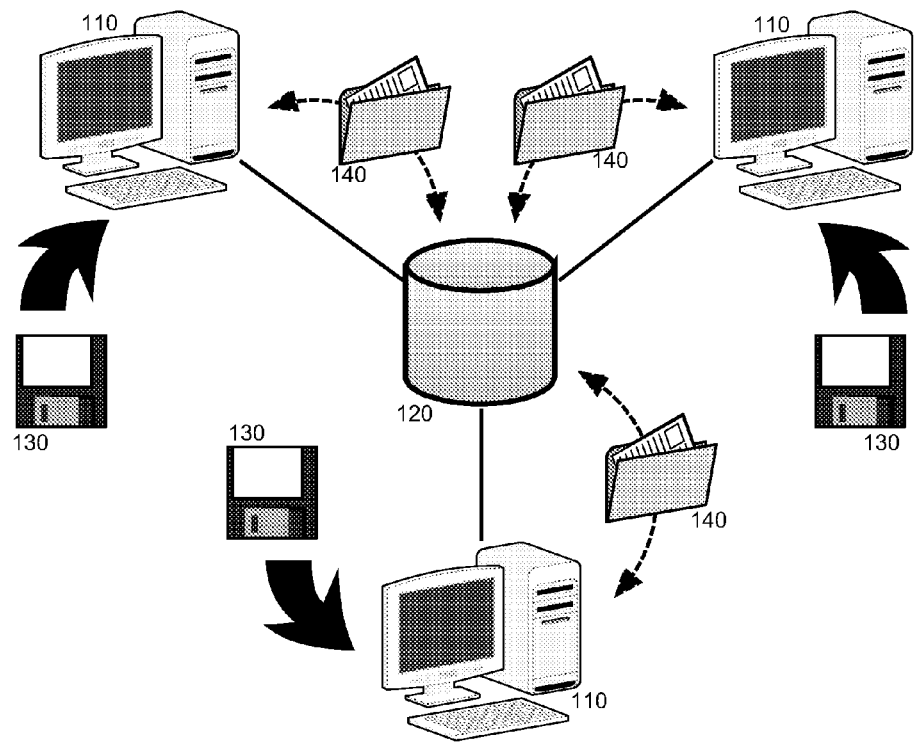
FIG. 1 is a pictorial illustration of an autonomic application installation system.

In illustration, FIG. 1 pictorially depicts an autonomic application installation system. In an autonomic application system, multiple different computing systems 110 can be coupled to a common data store 120 of configuration data for application installation. An application 130 can be installed into each of the computing systems 110. Upon successfully completing an installation in a particular one of the computing systems 110, the configuration 140 utilized for the particularly one of the computing systems 110 can be uploaded to the common data store 120 along with a platform description for the particular one of the computing systems 110. Thereafter, prior to installing the application 130 into a different one of the computing systems 110, the common data store 120 can provide a known successful configuration 140 for the different one of the computing systems according to a matching platform description. In this way, the guesswork associated with application installation configuration can be obviated in favor of strategic knowledge.

Figure 2:
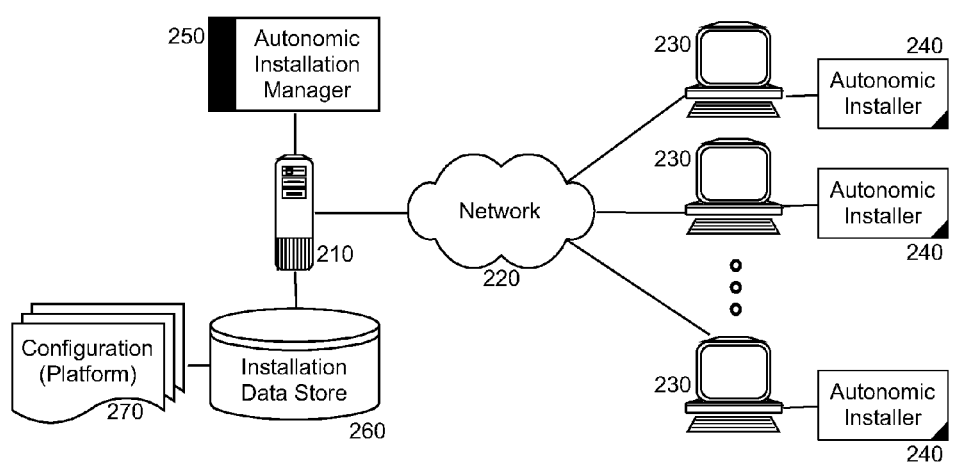
FIG. 2 is a computer communications network configured for autonomic application installation; and, FIG. 3 is a flow chart illustrating a process for autonomic application installation.

In further illustration, FIG. 2 shows a computer communications network data processing system configured for autonomic application installation. The system can include one or more computing systems 230 coupled to a remote host 210 over computer communications network 220. The remote host 210 can be communicatively linked to an installation data store 260 of different system configurations 270 for different platform types for the different systems 230. Notably, each of the computing systems 230 can support the operation of an autonomic installer 240 for installing an application onto a corresponding one of the computing systems 230. Each of the autonomic installers 240 further can be enabled to cooperate with an autonomic installation manager 250 in the remote host 210 in establishing a preferred configuration for installing an application for a target one of the computing systems 230.

In this regard, upon the successful completion of an application installation onto a target one of the computing systems 230, the platform identity of the target one of the computing systems 230 can be uploaded to the installation data store 260 along with a configuration of the target one of the computing systems 230. In this regard, the platform identity can range from a mere identifier to a fuller description of the target one of the computing systems 230 so as to be able to classify the different computing systems 230 according to similar characteristics. Thereafter, prior to installing an application onto a different one of the computing systems 230, the program code of the autonomic installer 240 can cooperate with the autonomic installation manager 250 to retrieve a recommended configuration 270 from the installation data store 260 based upon a platform identity of the different one of the computing systems 230. Importantly, the continuous tuning of the installation data store through the different successful installations of a single application in multiple different ones of the computing systems 230 can provide a more intelligent way of establishing a proper configuration for future installations onto similar platforms.

Figure 3:
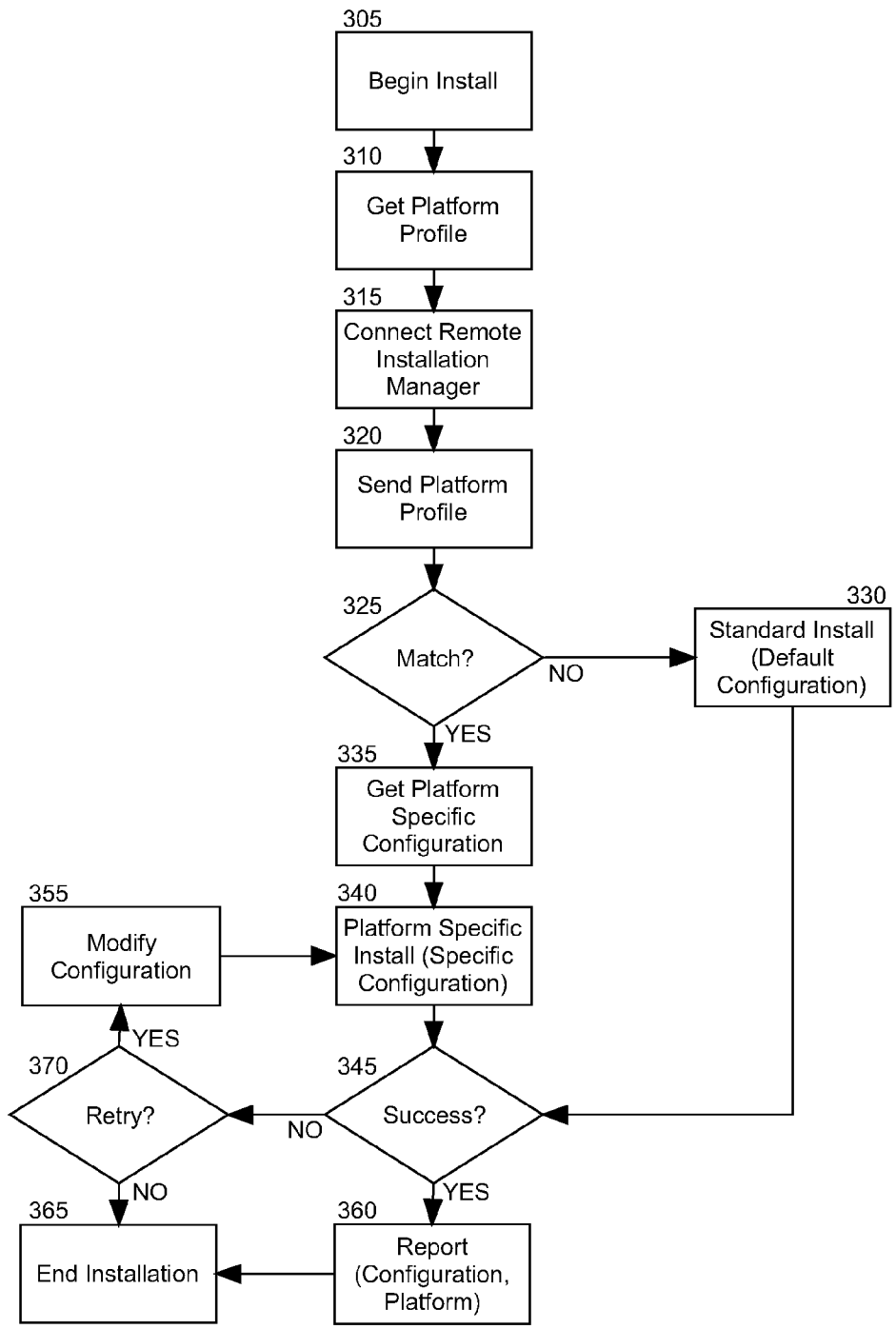

In yet further illustration, FIG. 3 is a flow chart illustrating a process for autonomic application installation. Beginning in block 305, an installation process can commence in a target computing system. In block 310, a platform profile for the target computing system can be retrieved and in block 315, a connection can be established with a remote installation manager. In block 320, the platform profile for the target computing system can be provided to the remote installation manager and in decision block 325, it can be determined whether or not the platform profile matches an existing platform profile in data store of installation configurations. If not, in block 330 a default configuration can be utilized when installing the application. Otherwise, the process can continue through block 335.

In block 335, a specific platform configuration can be retrieved for the platform profile from the data store of installation configurations. In block 340, the specific configuration can be applied to the target computing system and the application can be installed onto the target computing system. In decision block 345, it can be determined whether or not the installation has been successful. If not, in decision block 370 it can be determined whether or not a retry of the installation is desired. If so, the configuration can be modified to facilitate a successful installation, as show in block 355, and the process can repeat through block 340. In decision block 345, if the installation is determined to have been successful, in block 360 the configuration applied to the target computing system and the platform profile of the target computing system can be reported to the remote installation manager for persistence in the data store of installation configurations and the process can end in block 365.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An autonomic application installation method comprising:
    establishing a communicative connection by an autonomic installation manager executing in memory of a computer to different target computing systems, each of the different target computing systems installing a same application thereon;
    receiving by the autonomic installation manager in connection with installing the same application by ones of the different target computing systems, individual requests for a current configuration for a particular corresponding platform profile;
    distributing from a common data store coupled to the computer to each requesting one of the different target computing systems by the autonomic installation manager, a current configuration for a platform profile corresponding to the requesting one of the different target computing systems; and,
    responsive to each successful installation of the same application by each requesting one of the different target computing systems, updating by the autonomic installation manager in the common data store the current configuration for the platform profile corresponding to the requesting one of the different target computing systems.

2. The method of claim 1, wherein the current configuration specifies an addition of registry settings.

3. The method of claim 1, wherein the current configuration specifies a modification of registry settings.

4. The method of claim 1, wherein the current configuration specifies an addition of entries to one or more initialization files.

5. The method of claim 1, wherein the current configuration specifies a modification of entries to one or more initialization files.

6. The method of claim 1, wherein the common data store additionally includes a mapping of current configurations to platform profiles.

7. An autonomic application installation data processing system comprising:
    a computer with memory and at least one processor;
    a data store coupled to the computer and storing different current configurations for respectively different platform profiles; and,
    an autonomic installation manager executing in the memory of the computer, the manager comprising program code enabled during execution to:
    establish a communicative connection to different target computing systems over a computer communications network, each of the different target computing systems installing a same application thereon;
    receive in connection with installing the same application by ones of the different target computing systems, individual requests for a current configuration for a particular corresponding platform profile in the data store;
    distribute from the data store to each requesting one of the different target computing systems one of the current configurations for an associated platform profile corresponding to the requesting one of the different target computing systems; and,
    respond to each successful installation of the same application by each requesting one of the different target computing systems, by updating in the data store one of the current configurations for an associated one of the platform profiles corresponding to the requesting one of the different target computing systems.

8. The system of claim 7, wherein the current configurations specify an addition of registry settings.

9. The system of claim 7, wherein the current configurations specify a modification of registry settings.

10. The system of claim 7, wherein the current configurations specify an addition of entries to one or more initialization files.

11. The system of claim 7, wherein the current configuration specifies a modification of entries to one or more initialization files.

12. The system of claim 7, wherein the common data store additionally includes a mapping of current configurations to platform profiles.

13. A computer program product comprising a computer usable storage memory storing computer usable program code for autonomic application installation, the computer program product-comprising:
    computer usable program code for establishing a communicative connection to different target computing systems, each of the different target computing systems installing a same application thereon;
    computer usable program code for receiving in connection with installing the same application by ones of the different target computing systems, individual requests for a current configuration for a particular corresponding platform profile;
    computer usable program code for distributing from a common data store to each requesting one of the different target computing systems, a current configuration for a platform profile corresponding to the requesting one of the different target computing systems; and,
    computer usable program code for responding to each successful installation of the same application by each requesting one of the different target computing systems, by updating in the common data store the current configuration for the platform profile corresponding to the requesting one of the different target computing systems.

14. The computer program product of claim 13, wherein the current configuration specifies an addition of registry settings.

15. The computer program product of claim 13, wherein the current configuration specifies a modification of registry settings.

16. The computer program product of claim 13, wherein the current configuration specifies an addition of entries to one or more initialization files.

17. The computer program product of claim 13, wherein the current configuration specifies a modification of entries to one or more initialization files.

18. The computer program product of claim 13, wherein the common data store additionally includes a mapping of current configurations to platform profiles.

* * * * *